United States Patent
Persson

(10) Patent No.: US 10,080,164 B2
(45) Date of Patent: Sep. 18, 2018

(54) FAST UE MEASUREMENT EVENTS ACTIVATION

(71) Applicant: Telefonaktiebolaget LM Ericsson (publ), Stockholm (SE)

(72) Inventor: Magnus Persson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 15/514,490

(22) PCT Filed: Sep. 30, 2014

(86) PCT No.: PCT/SE2014/051132
§ 371 (c)(1),
(2) Date: Mar. 24, 2017

(87) PCT Pub. No.: WO2016/053152
PCT Pub. Date: Apr. 7, 2016

(65) Prior Publication Data
US 2017/0280362 A1   Sep. 28, 2017

(51) Int. Cl.
*H04W 36/00* (2009.01)
*H04W 36/36* (2009.01)
(Continued)

(52) U.S. Cl.
CPC ....... *H04W 36/0061* (2013.01); *H04W 24/10* (2013.01); *H04W 28/0268* (2013.01); *H04W 36/36* (2013.01)

(58) Field of Classification Search
CPC . H04W 28/0268; H04W 24/10; H04W 36/36; H04W 36/0061

(Continued)

(56) References Cited

U.S. PATENT DOCUMENTS

| 2014/0126544 A1 | 5/2014 | Khay-Ibbat et al. |
| 2014/0162650 A1 | 6/2014 | Islam et al. |
| 2015/0195758 A1* | 7/2015 | Kim ..................... H04W 24/10 370/252 |

FOREIGN PATENT DOCUMENTS

| WO | 2013038052 A1 | 3/2013 | |
| WO | WO 2013038052 | * 3/2013 | ............ H04W 36/00 |
| WO | 2014116154 A1 | 7/2014 | |

OTHER PUBLICATIONS

Introduction of SON IRAT MLB , R3-102313.*

(Continued)

*Primary Examiner* — Inder Mehra
(74) *Attorney, Agent, or Firm* — Sage Patent Group

(57) ABSTRACT

A mobile terminal and a method at the mobile terminal in a wireless communications network of reporting cell measurements, as well as a network node and a method at the network node of requesting cell measurements. The method at the mobile terminal in a wireless communications network of reporting cell measurements comprises determining at the mobile terminal that a property of a channel established via a serving cell fails to comply with a quality criterion. In direct response to such determination, the mobile terminal determines a property of one or more channels of at least one neighboring cell, and reports the determined property of the channel of the serving cell and the determined property of the channel(s) of the neighboring cell(s) to a network node of the serving cell.

13 Claims, 7 Drawing Sheets

(51) Int. Cl.
*H04W 28/02* (2009.01)
*H04W 24/10* (2009.01)

(58) Field of Classification Search
USPC ......... 455/436, 525, 63.3; 370/235; 380/272
See application file for complete search history.

(56) References Cited

OTHER PUBLICATIONS

International Search Report and Written Opinion, Application No. PCT/SE2014/051132, dated Jun. 22, 2015, 12 pages.
Shih-Fan Chou et al., "An Efficient Measurement Report Mechanism for Long Term Evolution Networks," 2011, pp. 197-201, IEEE 22nd International Symposium on Personal, Indoor and Mobile Radio Communications.
"Introduction of SON IRAT MLB," Aug. 23-27, 2010, 3 pages, 3GPP TSG-RAN WG3#69, R3-102313, NEC, Madrid, Spain.

\* cited by examiner

FAST UE MEASUREMENT EVENTS ACTIVATION

CROSS-REFERENCE TO RELATED APPLICATIONS

This application is a National stage of International Application No. PCT/SE2014/051132, filed Sep. 30, 2014, which is hereby incorporated by reference.

TECHNICAL FIELD

The invention relates to a mobile terminal and a method at the mobile terminal in a wireless communications network of reporting cell measurements. The invention further relates to a network node and a method at the network node in a wireless communications network of requesting cell measurements. The invention further relates to a computer program performing the method according to the present invention, and a computer program product comprising computer readable medium having the computer programs embodied therein.

BACKGROUND

In the art, handover (HO) of a mobile terminal from a serving cell to a neighbouring cell when channel quality is commonly performed. This is typically performed when channel quality for an ongoing data session or call in the serving cell becomes too poor, in which case the call or session is transferred to the neighbouring cell. The mobile terminal is typically a User Equipment (UE) such as a mobile phone, a personal digital assistant (PDA), a smart phone, a tablet, a laptop, a media player, etc.

Handover may be undertaken from a serving cell to a neighbouring cell employing the same Radio Access Technology (RAT), for instance via Evolved Universal Terrestrial Radio Access Network (E-UTRAN) in case of Long Term Evolution (LTE) communication. This is referred to as intra-RAT handover. Alternatively, handover may be undertaken from a serving cell to a neighbouring cell employing different RATs, for instance from E-UTRAN to Universal Terrestrial Radio Access Network (UTRAN) in case of Universal Mobile Telecommunication System (UMTS) communication or even to a non-3rd Generation Partnership Project (3GPP) technology such as Wireless Local Area Network (WLAN). This is referred to as inter-RAT handover.

In a typical wireless communications network, a network node such as a base station may serve many cells and each cell typically only covers a limited geographical area with some overlap; therefore, handover becomes a very important feature for the seamless mobility of UEs in the entire wireless communications network. The performance of handover also becomes an important factor that affects the user's experience and the amount of radio resources used for the connection. One main purpose of handover is to make sure the UE connection is always maintained by being served by the best frequency and cell. This requires continuous measurements of properties indicating cell capacity of the serving and neighbouring cells.

Another field requiring extensive cell measurements is downlink scheduling, where resources are scheduled/allocated to UEs for maximization of system throughput while maintaining agreed QoS contracts. In order for a scheduler at a base station to arrive at adequate scheduling decisions, the scheduler should ideally be aware of channel quality of all the UEs in the system. This results in extensive signalling.

In an example, when effecting inter-frequency/inter-RAT handover, the UE continuously measures quality of a channel established with a base station (referred to as an eNodeB in an LTE network) of the currently serving cell. In case a so called A2 event occurs in LTE, i.e. a value of a property of a channel established with the serving cell as measured by the UE falls below a predetermined quality threshold value, the UE responds with sending a measurement report accordingly to the eNodeB indicating that the quality of the serving cell has fallen below the threshold value.

The eNodeB will in its turn initiate a measurement of the quality of inter-frequency or inter-RAT neighbouring candidate cells to which the UE can be handed over. Thus, the eNodeB sends a Radio Resource Control (RRC) Connection Reconfiguration message thereby triggering a so called B5 event, i.e. instructing the UE to measure channel quality of the candidate cell(s) to determine if a value of a property of a channel established with the candidate cell is above a predetermined quality threshold value for the candidate cell. The UE will send a further report to the eNodeB regarding the quality of the candidate cell(s), on the basis of which further report the eNodeB will determine if and to which candidate cell the UE should be handed over.

This current approach of determining whether to handover the UE causes latency in the handover procedure, and further requires a great deal of signaling between the eNodeB and the UE.

SUMMARY

An object of the present invention is to solve, or at least mitigate, this problem in the art and to provide an improved method of reporting whether handover is required in a wireless communication network.

This object is attained in a first aspect of the present invention by a method at a mobile terminal in a wireless communications network of reporting cell measurements. The method comprises determining at the mobile terminal that a property of a channel established via a serving cell fails to comply with a quality criterion. In direct response to such determination, the mobile terminal determines whether the property complies with the quality criterion for one or more channels of at least one neighbouring cell, and reports the determined property of the channel(s) of the neighbouring cell(s) and the determined property of the serving cell to a network node of the serving cell.

This object is attained in a second aspect of the present invention by a mobile terminal configured to report cell measurements in a wireless communications network. The mobile terminal comprises a processing unit and a memory. The memory contains instructions executable by the processing unit, whereby the mobile terminal is operative to determine that a property of a channel established via a serving cell fails to comply with a quality criterion, to determine, in direct response to determining the failure to comply with the quality criterion, whether the property complies with the quality criterion for one or more channels of at least one neighbouring cell, and report, to a network node of the serving cell, the determined property of the one or more channels of the at least one neighbouring cell and the determined property of the serving cell.

Advantageously, by preconfiguring the mobile terminal (referred to in the following as a UE) to measure channel quality of one or more neighbouring cells, in case the UE detects that channel quality of the currently serving cell has decreased to a level where for instance the UE must be handed over to a neighbouring cell or where downlink re-scheduling of the UE (or other UEs) must be undertaken, the signalling load in the system will decrease. Thus, by having the UE measure the quality of the neighbouring cell as a direct response to the detection of the failure to comply with a serving cell channel quality criterion, signalling between the UE and a network node of the serving cell (e.g. an eNodeB) decreases.

In an advantageous exemplifying embodiment, the UE detects that a property of a channel established via the serving cell fails to comply with a quality criterion. For instance, a property referred to as Reference Signal Received Power (RSRP), i.e. an indication of average received power at the UE, is measured, and is found to be below a predetermined RSRP threshold value of the serving cell, in response to which the UE directly—without being instructed accordingly by the eNodeB—turns to at least one neighbouring cell being a candidate cell for handover.

The RSRP being under a predetermined serving cell threshold value is in LTE referred to as an A2 event. The A2 event triggers the UE to measure the RSRP of one or more channels (i.e. frequencies) of at least one candidate cell to which the UE subsequently can be handed over and report to the eNodeB. If the measured RSRP of the candidate cell is above a predetermined neighbour cell RSRP threshold value (which typically is set to the same value as the RSRP threshold of the serving cell), the UE is typically handed over to the neighbouring candidate cell, typically on a different frequency than the serving cell, by the eNodeB. This is referred to as an A5 event.

As a result of the UE directly performing measurements on the candidate cell in response to detecting that a handover from the serving cell is required, latency in the handover process is reduced, as is signalling between the UE and a network node managing the handover, for instance an eNodeB. Thus, when the UE detects that handover from the serving cell is required, it proceeds to identifying candidate neighbouring cell(s) for handover without reporting that handover is required to the eNodeB, and further without awaiting an RRC Connection Reconfiguration from the eNodeB in response thereto. Thereafter, the measured property of one or more channels of the identified candidate cell(s) are reported to the eNodeB, such that the eNodeB can determine if handover should be performed, and if so to which candidate cell the UE is to be handed over. As a result, latency in the handover process is reduced, since two rounds of signalling between the UE and the eNodeB is avoided. From this, it further follows that the signalling load on the UE as well as on the eNodeB is reduced. Further advantageous is that more robust mobility management is attained since less signalling in required to UEs experiencing inferior radio coverage.

In an alternative embodiment, the quality criterion that triggers the reporting of the UE to the eNodeB of serving cell and neighbouring cell conditions is not that the determined property of the serving cell property falls under a serving cell threshold value, but that the property in the neighbouring cell is an offset better than that of the serving cell. This is referred to in LTE as an A3 event. Thus, the quality of the serving cell is not necessarily poor, but it may be that the quality of the neighbouring cell is better, and the relation of the determined property of the neighbouring cell and the serving cell is subsequently reported to the eNodeB.

The property to be measured for the channel of the serving cell and the one or more channels of the neighbouring cell(s) may be embodied for instance by signal strength in the form of RSRP, Quality of Service (QoS) in the form of Reference Signal Received Quality (RSRQ), packet loss rate, latency, etc., of a channel established with the UE.

As an example, the channel quality criterion of the serving cell may be that packet loss rate should be less than 2%, or handover from the serving cell is required. If a candidate cell is identified where a corresponding candidate cell channel quality criterion is complied with, e.g. the packet loss rate should exceed 2%, the identified candidate cell is reported to the eNodeB, which will take a decision on whether to handover the UE to the candidate cell. It is possible that, to provide hysteresis, a threshold of the candidate cell is set slightly lower, where only candidate cells having a packet loss rate below 1.5% is reported, to avoid handover to candidate cells having quality on par with the serving cell.

In a further embodiment the UE modifies, in direct response to determining the failure to comply with the quality criterion in the serving cell, the quality criterion for one or both of the serving cell and the neighbouring cell and determines whether the property of a channel established via a serving cell fails to comply with the modified quality criterion and whether the property for one or more channels of at least one neighbouring cell complies with the modified quality criterion as set by the UE. For instance, when being triggered by an A3 event, the UE may be activate a further A3 event, but with modified threshold values for the serving cell and the neighbouring cell and report accordingly to the eNodeB.

The object is further attained in a third aspect of the present invention by a method at a mobile terminal in a wireless communications network of reporting cell measurements. The method comprises detecting at the mobile terminal that a property of a channel established via a serving cell fails to comply with a quality criterion, and reporting, to a network node of the serving cell, the failure to comply with the quality criterion, whereby the mobile terminal receives from the network node an Activation/Deactivation Media Access Control (MAC) Control Element (CE). In direct response to receiving the MAC CE, the mobile terminal determines whether said property for one or more channels of at least one neighbouring cell complies with the quality criterion, and reports the determined property of the serving cell and the determined property of the one or more channels of the at least one neighbouring cell to the network node.

This object is attained in a fourth aspect of the present invention by a mobile terminal configured to report cell measurements in a wireless communications network. The mobile terminal comprises a processing unit and a memory. The memory contains instructions executable by the processing unit, whereby the mobile terminal is operative to determine that a property of a channel established via a serving cell fails to comply with a quality criterion, and report, to a network node of the serving cell, the failure to comply with the quality criterion. The mobile terminal is further operative to receive, from the network node, an Activation/Deactivation MAC CE, determine, in direct response to receiving the Activation/Deactivation MAC CE, whether said property for one or more channels of at least one neighbouring cell complies with the quality criterion, and report, to the network node, the determined property for the channel of the serving cell and the property of the one or more channels of the at least one neighbouring cell.

As an alternative to having the mobile terminal respond directly to a determination that a property of a channel established via a serving cell fails to comply with a quality criterion by turning to a neighbouring cell, as in the first and second aspect of the present invention described in detail in the above, the direct response will in the third and fourth aspect rather be triggered by the reception of the MAC CE at the mobile terminal.

Advantageously, by preconfiguring the UE to respond directly to the received MAC CE with measuring an appropriate property of one or more channels of neighbouring cell(s), latency in the handover process is reduced, as is signalling between the UE and a network node managing the handover, for instance an eNodeB, since at least parts of the relatively extensive RRC Connection Reconfiguration signaling is avoided.

It should be noted that all embodiments described in connection to the first and second aspect of the present invention are applicable also to the third and fourth aspects of the present invention.

For instance, the Activation/Deactivation MAC CE can be used to trigger the mobile terminal to advantageously use preconfigured modified threshold levels to determine LTE measurement events based on corresponding measurement made on the serving cell and the neighbouring cell(s) using the modified threshold values.

In a fifth and sixth aspect of the present invention, a network node such as a base station (e.g. in the form of an eNodeB) is provided for attaining a corresponding functionality of the mobile terminal of the third and fourth aspect of the present invention.

Hence, in the fifth aspect of the present invention, a method at a network node in a wireless communications network is provided for requesting cell measurements. The method comprises receiving, from a mobile terminal located in a serving cell of the network node, an indication that a property of a channel established via the serving cell fails to comply with a quality criterion. The method further comprises sending an Activation/Deactivation MAC CE requesting the mobile terminal to determine whether said property for one or more channels of at least one neighbouring cell complies with the quality criterion, and receiving, from the mobile terminal, the determined property of the channel of the serving cell and the determined property of the one or more channels of said at least one neighbouring cell.

Moreover, in the sixth aspect of the present invention, a network node in a wireless communications network is provided configured to request cell measurements, comprising a processing unit and a memory, the memory containing instructions executable by the processing unit, whereby the network node is operative to receive, from a mobile terminal located in a serving cell of the network node, an indication that a property of a channel established via the serving cell fails to comply with a quality criterion, sending an Activation/Deactivation MAC CE requesting the mobile terminal to determine whether the property for one or more channels of at least one neighbouring cell complies with the quality criterion, and receiving, from the mobile terminal, the determined property of the channel of the serving cell and the determined property of the one or more channels of said at least one neighbouring cell.

Further provided are a computer program performing the method according to the present invention, and a computer program product comprising computer readable medium having the computer programs embodied therein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
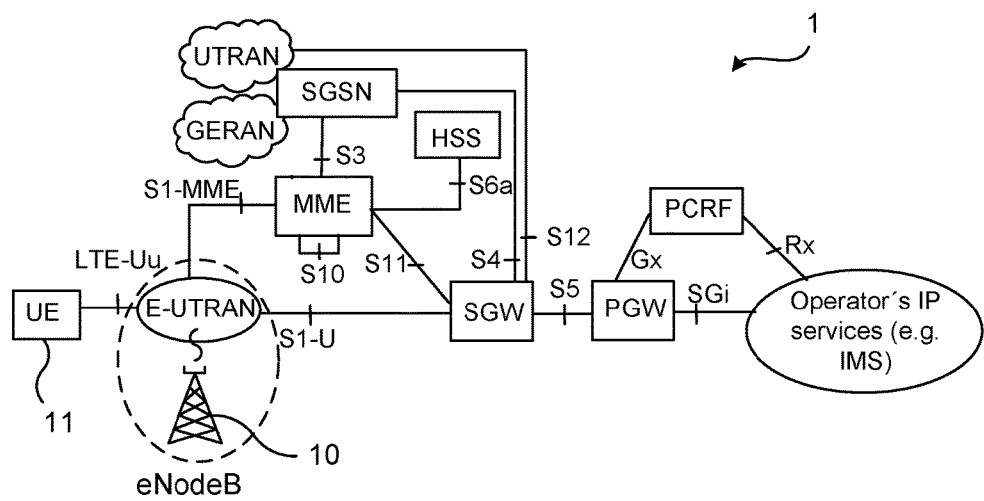
FIG. 1 shows a schematic overview of an exemplifying wireless communication system in which the present application can be implemented.

FIG. 1 shows a schematic overview of an exemplifying wireless communication system 1 in which the present invention can be implemented. The wireless communication system 1 is an LTE based system. It should be pointed out that the terms "LTE" and "LTE based" system is here used to comprise both present and future LTE based systems, such as, for example, advanced LTE systems. It should be appreciated that although FIG. 1 shows a wireless communication system 1 in the form of an LTE based system, the example embodiments herein may also be utilized in connection with other wireless communication systems, such as e.g. Global System for Communication (GSM) or UMTS, comprising nodes and functions that correspond to the nodes and functions of the system in FIG. 1.

The wireless communication system 1 comprises one or more base stations in the form of an eNodeB 10, operatively connected to a Serving Gateway (SGW), in turn operatively connected to a Mobility Management Entity (MME) and a Packet Data Network Gateway (PGW), which in turn is operatively connected to a Policy and Charging Rules Function (PCRF). The eNodeB 10 is a radio access node that interfaces with a mobile radio terminal 11, e.g. a UE or an Access Point. The eNodeB 10 of the system forms the E-UTRAN for LTE communicating with the UE 11 over an air interface such as LTE-Uu. The core network in LTE is known as Evolved Packet Core (EPC), and the EPC together with the E-UTRAN is referred to as Evolved Packet System (EPS). The SGW routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). For idle state UEs, the SGW terminates the downlink data path and triggers paging when downlink data arrives for the UE 11, and further manages and stores UE contexts, e.g. parameters of the IP bearer service, network internal routing information. It also performs replication of the user traffic in case of lawful interception. The SGW communicates with the MME via interface S11 and with the PGW via the S5 interface. Further, the SGW may communicate with the UMTS radio access network UTRAN and with the GSM EDGE ("Enhanced Data rates for GSM Evolution") Radio Access Network (GERAN) via the S12 interface via radio base stations referred to as NodeBs in UTRAN and Base Station Transceivers (BTSs).

The MME is responsible for idle mode UE tracking and paging procedure including retransmissions. It is involved in the bearer activation/deactivation process and is also responsible for choosing the SGW for a UE at the initial attach and at time of intra-LTE handover involving core network node relocation. It is responsible for authenticating the user by interacting with the Home Subscriber Server (HSS). The Non-Access Stratum (NAS) signaling terminates at the MME and it is also responsible for generation and allocation of temporary identities to UEs via the S1-MME interface. It checks the authorization of the UE 11 to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the Serving General Packet Radio Service (GPRS) Support Node (SGSN). The MME also terminates the S6a interface towards the home HSS for roaming UEs. Further, there is an interface S10 configured for communication between MMEs for MME relocation and MME-to-MME information transfer.

The PGW provides connectivity to the UE 11 to external packet data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1× and EvDO). The interface between the PGW and the packet data network, being for instance the Internet, is referred to as the SGi. The packet data network may be an operator external public or private packet data network or an intra operator packet data network, e.g. for provision of IP Multimedia Subsystem (IMS) services.

The PCRF determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF provides the PGW with such rules and/or policies or similar to be used by the acting PGW as a Policy and Charging Enforcement Function (PCEF) via interface Gx. The PCRF further communicates with the packet data network via the Rx interface.

Figure 2:
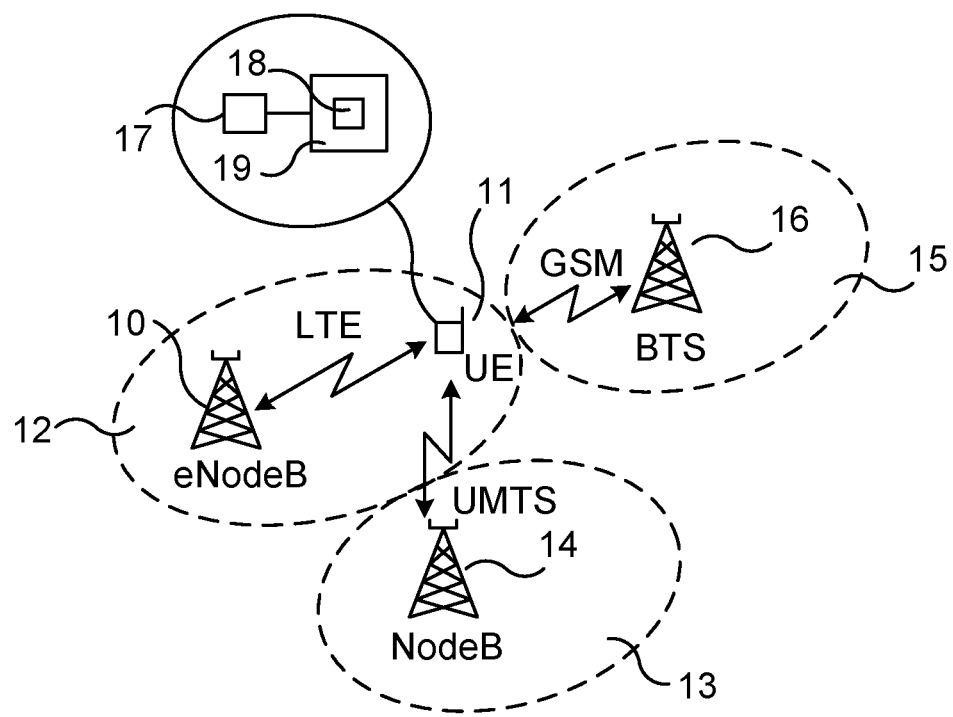
FIG. 2 illustrates inter-RAT handover of a mobile terminal in a communications network according to an embodiment of the present invention.

FIG. 2 illustrates a UE 11 communicating in a currently serving cell 12 with an eNodeB 10 comprised in a wireless communication system 1 as described in FIG. 1. Hence, in this particular exemplifying embodiment, the currently serving RAT is E-UTRAN (LTE). Now, as the UE 11 moves within the range of a first neighbouring cell 13 managed by NodeB 14 using UTRAN (UMTS) as RAT, or alternatively within the range of a second neighbouring cell 15 managed by BTS 16 using GERAN (GSM) as RAT, it may be necessary to determine whether to perform an inter-RAT handover of the UE 11 based on cell measurements, for instance from the eNodeB 10 of the serving LTE cell 12 to the NodeB 14 of the neighbouring UMTS cell 13.

As will be discussed in the following, the UE 11 according to an embodiment of the present invention will perform cell measurements and report to the eNodeB 10 of the serving cell 12. In practice, the method at the UE 11 of reporting cell measurements is performed by a processing unit 17 embodied in the form of one or more microprocessors arranged to execute a computer program 18 downloaded to a suitable storage medium 19 associated with the microprocessor, such as a Random Access Memory (RAM), a Flash memory or a hard disk drive. Thus, as is illustrated by means of dashed lines in FIG. 2, the processing unit 17 and the storage medium are included in the UE 11. The processing unit 17 is arranged to carry out the method according to embodiments of the present invention when the appropriate computer program 18 comprising computer-executable instructions is downloaded to the storage medium 19 and executed by the processing unit 17. The storage medium 19 may also be a computer program product comprising the computer program 18. Alternatively, the computer program 18 may be transferred to the storage medium 16 by means of a suitable computer program product, such as a Digital Versatile Disc (DVD) or a memory stick. As a further alternative, the computer program 18 may be downloaded to the storage medium 19 over a network. The processing unit 17 may alternatively be embodied in the form of a digital signal processor (DSP), an application specific integrated circuit (ASIC), a field-programmable gate array (FPGA), a complex programmable logic device (CPLD), etc. Further, even though not shown in FIG. 2, the respective base station typically comprises a corresponding processing unit and memory unit comprising a computer program executable by the processing unit.

Figure 3:
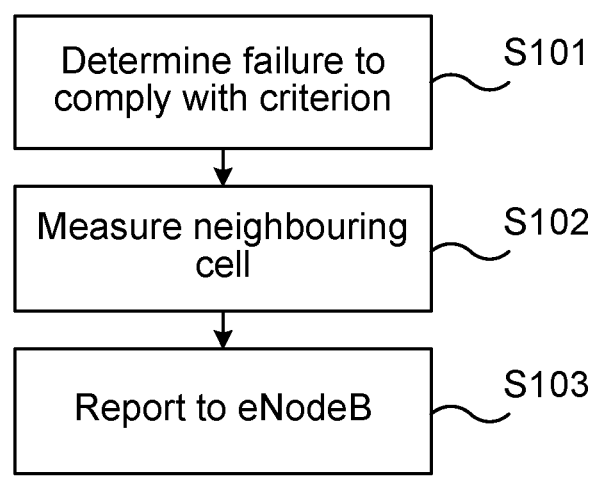
FIG. 3 illustrates a flow chart of an embodiment of a method according to an aspect of the present invention.

FIG. 3 illustrates a flow chart of an embodiment of a method according to an aspect of the present invention. Reference is further made to network elements shown in FIG. 2. In a first step S101, the UE 11 determines that a property of a channel established via the serving cell 12 fails to comply with a quality criterion. For instance, a property such as RSRP, i.e. an indication of average received power at the UE 11, is measured, and is found to be below a predetermined RSRP threshold value of the serving cell 12. This is commonly referred to as an A2 event. In response thereto, the UE 11 will in step S102 directly, without being instructed accordingly by the eNodeB 10, turn to at least one neighbouring cell being a candidate cell for handover in order to perform appropriate cell measurements.

Thus, in this particular embodiment, the UE 11 determines whether the above mentioned property complies with the quality criterion for one or more channels of a neighbouring cell by measuring the RSRP of the one or more channels established with the NodeB 14 of the neighbouring UMTS cell 13, to which the UE 11 potentially can be handed over. Thus, the UE 11 is preconfigured to directly respond to the A2 event (i.e. to the quality criterion with which the UE fails to comply) by turning to a neighbouring cell, which advantageously decreases signalling load on the UE 11 and the eNodeB 10 over the LTE-Uu interface. In step S103, the UE 11 reports the measurements performed in the neighbouring cell 13 and in the serving cell 12 to the eNodeB 10, which hence can take an adequate decision on whether to handover the UE 11 to the NodeB 14 of the neighbouring UMTS cell 13.

If the measured RSRP of the neighbouring cell 13 is above a predetermined RSRP threshold value while the RSRP of the serving cell is below the threshold value as discussed in the above, an event commonly referred to as B2 occurs. Typically, hysteresis is provided such that the threshold value of the neighbouring cell is higher than the threshold value of the serving cell.

Thus, in an embodiment of the present invention, the measured RSRP of the serving cell as well as the measured RSRP of the neighbouring cell is reported by the UE 11 to the eNodeB 10 in terms of measured physical values.

However, in an alternative embodiment, the UE 11 reports that a B2 even has occurred, in which case the eNodeB 10 can perform an inter-RAT handover of the UE 11 from the currently serving cell 12 to the NodeB 14 of the neighbouring cell 13 without taking any further decisions.

In embodiments of the present invention, other LTE events can be envisaged, such as e.g. an A3 event where the UE 11 reports to the eNodeB 10 that the measured RSRP of the neighbouring UMTS cell 13 is better by an offset value than the measured RSRP of the serving LTE cell 12.

Figure 4:
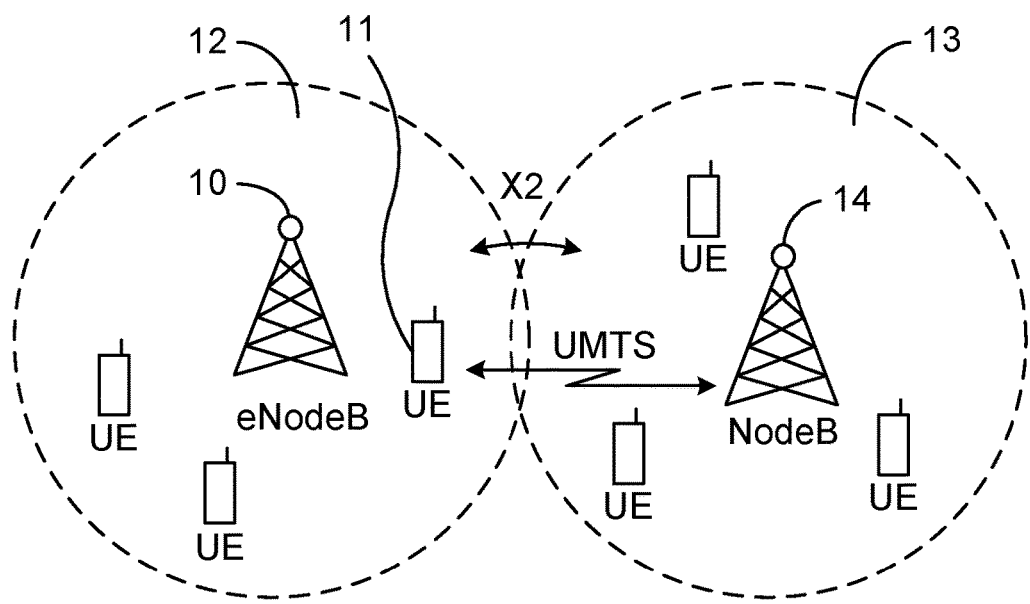
FIG. 4 illustrates resource scheduling for mobile terminals in a communications network according to an embodiment of the present invention.

FIG. 4 illustrates a further application in which the present invention advantageously can be implemented; downlink scheduling as previously has been mentioned. In LTE communications networks, orthogonal frequency-division multiplexing (OFDM) modulation is employed, and a network element known as a scheduler (not shown) implemented at the eNodeB dynamically assigns OFDM resource blocks to UEs for uplink or downlink transmission. Typically the scheduling is performed at each Transmission Time Interval (TTI). To provide an optimal resource allocation, a scheduler should take into account the difference in quality among resource blocks. The radio conditions vary among the UEs and a resource block may hence be more valuable for some UEs than others. The scheduler could aim at optimizing a single parameter, or a number of parameters, depending on the goals of an operator of the communications network. As in the previously described inter-RAT handover embodiment, the scheduler at the eNodeB 12 will need measurement reports from UEs.

The eNodeB 10 of the serving cell 12 requires channel information in order to schedule resources for the UEs in its cell 12. In practice, the eNodeB 10 of the serving cell 12 will schedule a large number of UEs. Thus, the eNodeB 10 allocates one or more resource blocks to the UEs in its cell 12 based on measurement reports from the UEs. The UE 11 may thus detect that for instance the RSRP of the serving cell 12 is below a predetermined RSRP threshold value of the serving cell 12. In response thereto, the UE 11 will directly turn to the neighbouring cell to perform appropriate cell measurements as described with reference to the flowchart of FIG. 3, and report to the eNodeB 10 which thereby can take adequate scheduling decisions, i.e. how to allocate resource blocks. Further, the eNodeB 10 may send information as to which resource blocks to allocate to which UE over the so called X2 communication interface to the NodeB 14 of the neighbouring cell 13, which may use this information for scheduling purposes in its own cell 13. For instance, inter-cell interference can be reduced since the NodeB 14 of the neighbouring cell 13 takes into account predicted resource allocation of the serving cell 12 in that the NodeB 14 will avoid resource blocks already predicted to be selected for the UEs of the cell 12.

Figure 5:
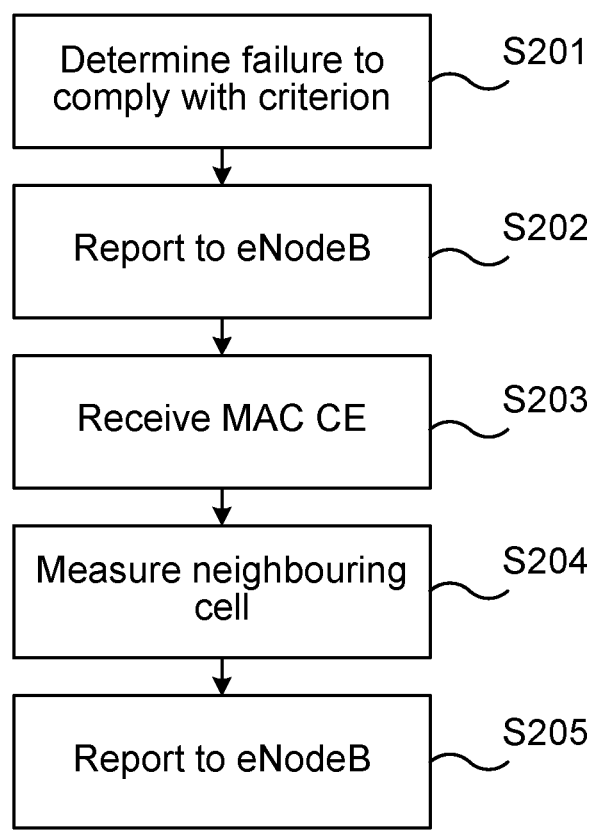
FIG. 5 illustrates a flow chart of an embodiment of a method according to another aspect of the present invention.

FIG. 5 illustrates a flow chart of an embodiment of a method according to another aspect of the present invention. Reference is further made to network elements shown in FIG. 2. In a first step S201, the UE 11 detects that a property of a channel established via the serving cell 12 fails to comply with a quality criterion. For instance, a property such as RSRP is measured and is found to be below a predetermined RSRP threshold value of the serving cell 12, i.e. an A2 event occurs, which is reported to the eNodeB 10 in step S202. The eNodeB 10 accordingly sends an Activation/Deactivation MAC CE in step S203 to the UE 11. In response to receiving the Activation/Deactivation MAC CE in step S203, the UE 11 will in step S204 turn to at least one neighbouring cell being a candidate cell for handover in order to perform appropriate cell measurements.

Thus, in this particular embodiment, the UE 11 measures the RSRP of one or more channels established with the NodeB 14 of the neighbouring UMTS cell 13, to which the UE 11 potentially can be handed over. Thus, the UE 11 is preconfigured to directly respond to the received Activation/Deactivation MAC CE by turning to a neighbouring cell, which advantageously decreases signalling load on the UE 11 and the eNodeB 10 over the LTE-Uu interface. When employing the Activation/Deactivation MAC CE, the delay in communication between the eNodeB and the mobile terminal will decrease. In step S205, the UE 11 reports the measurements performed in the neighbouring cell 13 to the eNodeB 12, which hence can take an adequate decision on whether to handover the UE 11 to the NodeB 14 of the neighbouring UMTS cell 13.

Figure 6:
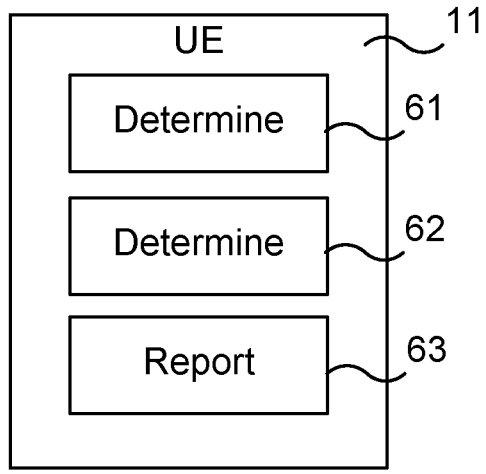
FIG. 6 shows a mobile terminal according to an embodiment of the present invention.

FIG. 6 shows a mobile terminal 11 in a wireless communications network configured to report cell measurements according to an embodiment of the present invention. The mobile terminal 11 comprises determining means 61 adapted to determine that a property of a channel established via a serving cell fails to comply with a quality criterion, determining means 62 adapted to determine, in direct response to determining the failure to comply with the quality criterion, whether the property for one or more channels of at least one neighbouring cell complies with the quality criterion, and reporting means 63 adapted to report, to a network node of the serving cell, the determined property of the channel of the serving cell and the determined property of the one or more channels of the at least one neighbouring cell. The mobile terminal 11 may further comprise a local storage for storing obtained data. The various means 61,62, 63 may (in analogy with the description given in connection to FIG. 2) be implemented by a processor embodied in the form of one or more microprocessors arranged to execute a computer program downloaded to a suitable storage medium associated with the microprocessor, such as a RAM, a Flash memory or a hard disk drive. The various means 61, 62, 63 may further comprise one or more transmitters and/or receivers and/or transceivers, comprising analogue and digital components and a suitable number of antennae for radio communication.

Figure 7:
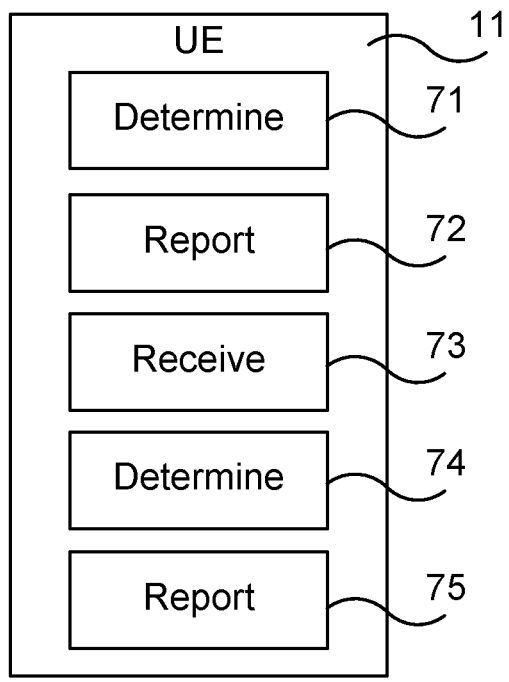
FIG. 7 shows a mobile terminal according to another embodiment of the present invention.

FIG. 7 shows a mobile terminal 11 in a wireless communications network configured to report cell measurements according to another embodiment of the present invention.

The mobile terminal 11 comprises determining means 71 adapted to determine that a property of a channel established via a serving cell fails to comply with a quality criterion, reporting means 72 adapted to report, to a network node of the serving cell, the failure to comply with the quality criterion, receiving means 73 adapted to receive, from the network node, an Activation/Deactivation MAC CE, determining means 74 adapted to determine, in direct response to receiving the Activation/Deactivation MAC CE, whether said property for one or more channels of at least one neighbouring cell complies with the quality criterion, and reporting means 75 adapted to report, to the network node, the determined property of the channel of the serving cell and the determined property of the one or more channels of said at least one neighbouring cell. The mobile terminal 11 may further comprise a local storage for storing obtained data. The various means 71,72, 73, 74, 75 may (in analogy with the description given in connection to FIG. 2) be implemented by a processor embodied in the form of one or more microprocessors arranged to execute a computer program downloaded to a suitable storage medium associated with the microprocessor, such as a RAM, a Flash memory or a hard disk drive. The various means 71, 72, 73, 74, 75 may further comprise one or more transmitters and/or receivers and/or transceivers, comprising analogue and digital components and a suitable number of antennae for radio communication.

Figure 8:
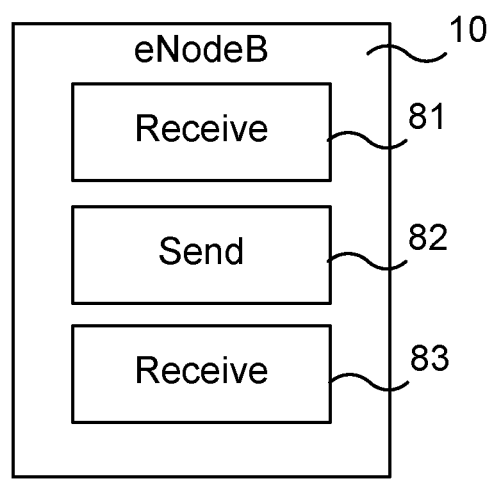
FIG. 8 shows a network node according to an embodiment of the present invention.

FIG. 8 shows a network node 10 in a wireless communications network configured to report cell measurements according to a further embodiment of the present invention. The network node 10 comprises receiving means 81 adapted to receive, from a mobile terminal located in a serving cell of the network node, an indication that a property of a channel established via the serving cell fails to comply with a quality criterion, sending means 82 adapted to send an Activation/Deactivation MAC CE requesting the mobile terminal to determine whether said property for one or more channels of at least one neighbouring cell complies with the quality criterion, and receiving means 83 adapted to receive, from the mobile terminal, the determined property of the channel of the serving cell and the determined property of the one or more channels of said at least one neighbouring cell. The network node 10 may further comprise a local storage for storing obtained data. The various means 81, 82, 83 may (in analogy with the description given in connection to FIG. 2) be implemented by a processor embodied in the form of one or more microprocessors arranged to execute a computer program downloaded to a suitable storage medium associated with the microprocessor, such as a RAM, a Flash memory or a hard disk drive. The various means 81, 82, 83 may further comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method at a mobile terminal in a wireless communications network of reporting cell measurements, comprising:
   determining at the mobile terminal that a property of a channel established via a serving cell fails to comply with a quality criterion;
   determining, in direct response to determining the failure to comply with the quality criterion, whether said property for one or more channels of at least one neighboring cell complies with the quality criterion; and
   reporting, to a network node of the serving cell, the determined property of the channel of the serving cell and the determined property of the one or more channels of said at least one neighboring cell;
   wherein the property of the channel established via the serving cell is considered to fail to comply with the quality criterion if it is an offset below the property of the one or more channels of said at least one neighbouring cell.

2. The method of claim 1, wherein the property of the channel established via the serving cell is considered to fail to comply with the quality criterion if it is below a threshold value, and the property of the one or more channels of said at least one neighboring cell is considered to comply with the quality criterion if it is above the threshold.

3. The method of claim 1, further comprising:
   modifying, at the mobile terminal, in direct response to determining the failure to comply with the quality criterion, the quality criterion for one or both of the serving cell and the at least one neighboring cell and determining whether the property of the channel established via the serving cell fails to comply with the modified quality criterion and whether the property for the one or more channels of said at least one neighboring cell complies with the modified quality criterion.

4. A method at a mobile terminal in a wireless communications network of reporting cell measurements, comprising:
   determining at the mobile terminal that a property of a channel established via a serving cell fails to comply with a quality criterion;
   reporting, to a network node of the serving cell, the failure to comply with the quality criterion;
   receiving, from the network node, an Activation/Deactivation Media Access Control, Control Element;
   determining, in direct response to receiving the Activation/Deactivation MAC CE, whether said property for one or more channels of at least one neighboring cell complies with the quality criterion;
   modifying, at the mobile terminal, in direct response to receiving the Activation/Deactivation MAC CE, the quality criterion for one or both of the serving cell and the at least one neighboring cell and determining whether the property of the channel established via the serving cell fails to comply with the modified quality criterion and whether the property for the one or more channels of said at least one neighboring cell complies with the modified quality criterion; and
   reporting to the network node, the determined property of the channel of the serving cell and the determined property of the one or more channels of said at least one neighboring cell.

5. A mobile terminal in a wireless communications network configured to report cell measurements, comprising:
   a processing unit; and
   a memory, said memory containing instructions executable by said processing unit, in which the instructions, when executed on said processing unit, cause said mobile terminal to perform operations to:
      determine that a property of a channel established via a serving cell fails to comply with a quality criterion;

determine, in direct response to determining the failure to comply with the quality criterion, whether said property for one or more channels of at least one neighboring cell complies with the quality criterion; and report, to a network node of the serving cell, the determined property of the channel of the serving cell and the determined property of the one or more channels of said at least one neighboring cell;

wherein the property of a channel established via a serving cell is determined to fail to comply with the quality criterion if it is an offset below the property of the one or more channels of said at least one neighbouring cell.

6. The mobile terminal of claim 5, wherein the property of a channel established via a serving cell is determined to fail to comply with the quality criterion if it is below a threshold value, and the property of the one or more channels of said at least one neighboring cell is determined to comply with the quality criterion if it is above the threshold value.

7. The mobile terminal of claim 5, further being configured to:

modify, in direct response to determining the failure to comply with the quality criterion, the quality criterion for one or both of the serving cell and the at least one neighboring cell and determining whether the property of the channel established via the serving cell fails to comply with the modified quality criterion and whether the property for the one or more channels of said at least one neighboring cell complies with the modified quality criterion.

8. A mobile terminal in a wireless communications network configured to report cell measurements, comprising:

a processing unit; and a memory, said memory containing instructions executable by said processing unit, in which the instructions, when executed on said processing unit, cause said mobile terminal to perform operations to:

determine that a property of a channel established via a serving cell-424 fails to comply with a quality criterion;

report, to a network node of the serving cell, the failure to comply with the quality criterion;

receive, from the network node, an Activation/Deactivation Media Access Control (MAC) Control Element, (CE);

determine, in direct response to receiving the Activation/Deactivation MAC CE, whether said property for one or more channels of at least one neighboring cell complies with the quality criterion;

modify, in direct response to receiving the Activation/Deactivation MAC CE, the quality criterion for one or both of the serving cell and the at least one neighboring cell and determine whether the property of the channel established via the serving cell fails to comply with the modified quality criterion and whether the property for the one or more channels of said at least one neighboring cell complies with the modified quality criterion; and report, to the network node, the determined property of the channel of the serving cell and the determined property of the one or more channels of said at least one neighboring cell.

9. The mobile terminal of claim 8, wherein the mobile terminal being a mobile phone, a personal digital assistant, PDA, a smart phone, a tablet, a laptop, a media player, a Bluetooth Access Point (AP) or a Wi-Fi AP.

10. A non-transitory computer readable storage medium having instructions stored therein, which when the instruction are executed on a processing unit included in a mobile terminal, cause the mobile terminal to perform operations comprising:

determining at the mobile terminal that a property of a channel established via a serving cell fails to comply with a quality criterion;

determining, in direct response to determining the failure to comply with the quality criterion, whether said property for one or more channels of at least one neighboring cell complies with the quality control criterion; and reporting, to network node of the serving cell, the determined property of the channel of the serving cell and the determined property of the one or more channels of said at least one neighboring cell;

wherein the instructions, when executed on the processing unit, further cause the mobile terminal to perform operations, in which the property of the channel established via the serving cell is considered to fail to comply with the quality criterion if it is an offset below the property of the one or more channels of said at least one neighbouring cell.

11. The non-transitory computer readable storage medium of claim 10, wherein the instructions, when executed on the processing unit, further cause the mobile terminal to perform operations, in which the property of the channel established via the serving cell is considered to fail to comply with the quality criterion if it is below a threshold value, and the property of the one or more channels of said at least one neighboring cell is considered to comply with the quality criterion if it is above the threshold.

12. The non-transitory computer readable storage medium of claim 10, wherein the instructions, when executed on the processing unit, further cause the mobile terminal to perform operations, comprising:

modifying, at the mobile terminal, in direct response to determining the failure to comply with the quality criterion, the quality criterion for one or both of the serving cell and the at least one neighboring cell and determining whether the property of the channel established via the serving cell fails to comply with the modified quality criterion and whether the property for the one or more channels of said at least one neighboring cell complies with the modified quality criterion.

13. A non-transitory computer readable storage medium having instructions stored therein, which when the instructions are executed on a processing unit included in a mobile terminal, cause the mobile terminal in a wireless communications network of reporting cell measurements to perform operations comprising:

determining at the mobile terminal that a property of a channel established via a serving cell fails to comply with a quality criterion;

reporting, to a network node of the serving cell, the failure to comply with the quality criterion;

receiving, from the network node, an Activation/Deactivation Media Access Control (MAC) Control Element (CE);

determining, in direct response to receiving the Activation/Deactivation MAC CE, whether said property for one or more channels of at least one neighboring cell complies with the quality criterion;

modifying, at the mobile terminal, in direct response to receiving the Activation/Deactivation MAC CE, the quality criterion for one or both of the serving cell and the at least one neighboring cell and determining whether the property of the channel established via the serving cell fails to comply with the modified quality criterion and whether the property for the one or more channels of said at least one neighboring cell complies with the modified quality criterion; and reporting, to the network node, the determined property of the channel of the serving cell and the determined property of the one or more channels of said at least one neighboring cell.

\* \* \* \* \*